United States Patent Office 3,049,512
Patented Aug. 14, 1962

3,049,512
VINYLOXYARYL SULPHONIC ACIDS AND POLYMERS THEREOF
André Fournet and Hubert Lemoine, Lyon, France, assignors to Societe des Usines Chimiques Rhone-Poulenc, Paris, France, a body corporate of France
No Drawing. Filed Feb. 9, 1960, Ser. No. 7,541
Claims priority, application France Feb. 11, 1959
7 Claims. (Cl. 260—49)

This invention relates to vinyl derivatives and more particularly to the provision of a new class of vinyl derivatives, to their production and to the production of polymers and copolymers thereof.

According to the present invention there are provided vinyl derivatives of the general Formula I:

$$CH_2=CH-O-Ar-(SO_3R)_n \quad \text{I}$$

wherein Ar represents an aromatic hydrocarbon group or an aromatic hydrocarbon group containing a substituent selected from alkyl, cycloalkyl and aryl groups and halogen atoms, R represents a hydrogen atom, a metal atom or a hydrocarbon group, and $n$ is 1, 2 or 3. The aforesaid compounds are vinyloxyaryl sulphonic acids and their salts and esters.

According to a further feature of the invention there is provided a process for the production of alkali metal salts of the vinyloxyaryl sulphonic acids of general Formula I which comprises sulphonating compounds of the general Formula II:

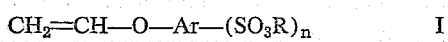

$$Hal.CH_2.CH_2.O.Ar$$

where Hal is a halogen atom and Ar has the meaning assigned to it above, and subjecting the products to treatment with alkali metal hydroxide. The β-halogenoethoxy-aryl sulphonic acids obtained as intermediates, when subjected to the action of an aqueous solution of an alkali metal hydroxide, lose one molecule of hydrogen halide and are converted into alkali salts of vinyloxyaryl-sulphonic acids, from which the corresponding acids or esters can be prepared by methods known per se.

Compounds of general Formula II may be prepared by known methods, for example by the action of a dihalogenoethan, more especially dibromoethane, on a hydroxyaryl compound in the presence of alkali. The sulphonation may be effected, for example, by the action of hot concentrated sulphuric acid or by treatment with any other sulphonating agent known per se. Depending upon the operating conditions, one or more sulphonic groups are introduced into the aromatic nucleus.

The aromatic group may be derived from benzene and its alkylated or cycloalkylated homologues, or from polycyclic hydrocarbons, such as diphenyl, naphthalene or anthracene, and their alkylated homologues. Any of such groups may carry halogen substituent groups.

Owing to the presence of the vinyl group, the compounds of general Formula I according to the invention may be polymerised and the present invention accordingly further includes homopolymers thereof and copolymers thereof with other unsaturated derivatives such as olefines, diolefines, vinylaromatic derivatives, vinyl ethers and esters, vinyl ketones, unsaturated acids and their esters, amides and nitriles, and unsaturated nitrogen derivatives.

The alkali metal salts of homopolymers of the vinyloxyaryl sulphonic acids of general Formula I are soluble in water, as also are the copolymers containing high proportions of vinyloxyaryl sulphonic acids. These polymers and copolymers can be used as emulsifiers. The presence of sulphonic groupings in those copolymers which are not soluble in water imparts to these copolymers hydrophilic properties and an affinity for basic dyes.

Thus copolymers of the vinyloxyaryl sulphonic acids of general Formula I with acrylonitrile, may be dyed with basic dyes and this forms a particularly valuable feature of the invention. It is generally sufficient to copolymerise with acrylonitrile a small proportion of vinyloxyaryl sulphonic acid, e.g. from 0.5% to 2%, in order to impart to the polymer obtained an excellent dye affinity. It is also possible to prepare copolymers having a higher proportion of vinyloxyaryl sulphonic acids, for example from 2% to 15%, and if desired to mix from 5% to 25% of these polymers with homopolymers or copolymers of acrylonitrile.

It has further been found that by including, as a third component in the copolymerisation mixture of acrylonitrile and vinyloxyaryl sulphonic acid, an acrylic or methacrylic ester, such as methyl, ethyl, butyl or ethyl-hexyl esters, it is possible to improve the dyeability and to widen the range of dyes which may be employed. The said third component may usefully be employed in a proportion of from 1% to 10% of the mixture.

The polymerisation is preferably carried out in aqueous medium in which the alkali salts of the vinyloxyaryl sulphonic acids are soluble. The monomer or mixture of monomers is dissolved or dispersed in this medium and a conventional polymerisation catalyst is added.

The following examples will serve to illustrate the invention. Parts given are by weight.

EXAMPLE I

*Preparation of Sodium Vinyloxybenzene-Sulphonate*

A mixture consisting of 785 g. of phenol, 2000 g. of dibromoethane and 2 litres of water is heated to boiling point, and 375 g. of sodium hydroxide is then added. 970 g. of β-bromoethoxybenzene are thus obtained.

The β-bromoethoxybenzene obtained is thereafter sulphonated by heating at 95–100° C. for 3 hours with sulphuric acid (66° Bé.) in a proportion of 1.1 mols of sulphuric acid to 1 mol of bromoethoxybenzene. After cooling, the mixture is diluted with 100 cc. of water per mol of β-bromoethoxybenzene and the product is then neutralised at 15° to 25° C., with sodium hydroxide solution (36° Bé.). Sodium β-bromoethoxybenzene-sulphonate is thus obtained in a yield of 90%.

To a solution of 2 mol. of this salt in 1000 cc. of water, heated at 85° C., is added, drop-by-drop during 30 minutes and with agitation, a sodium hydroxide solution obtained by dissolving 2.4 mol. of sodium hydroxide in 180 cc. of water. After agitation for 1½ hours at 85° C., sodium vinloxybenzene sulphonate is obtained in a yield of 96.2%. On cooling, the alkali salt crystallises. It is purified by recrystallisation.

The sodium vinyloxybenzene-sulphonate may be kept in aqueous solution without risk of polymerisation provided that the pH of the solution is maintained between 7 and 9.

It is not necessary to isolate the sodium vinyloxybenzene sulphonate when it is required to make polymers or copolymers therefrom; for such purposes the solution obtained after the dehydrobromination step may be employed.

EXAMPLE II

*Copolymerisation of Potassium Vinyloxybenzene-Sulphonate With Acrylonitrile*

Into a reactor are introduced a dispersion of acrylonitrile in water and potassium vinyloxybenzene-sulphonate in the proportions indicated in the following table. The combined monomers represent a concentration of 10% by weight. The mixture is brought to a pH of 2.5 by the addition of sulphuric acid and heated in an inert atmosphere to 42° C. 1.62 parts of sodium bisulphite and 0.5 part of potassium chlorate per 100 parts of monomers are then introduced. The quantity of such catalysts is voluntarily limited so as not to exceed a degree of conversion of 60–70%, which is favourable to the production of a polymer having a low degree of branching. The polymerisation is ended in 20 minutes. After elumination of the unreacted monomers by washing, followed by drying, copolymers are obtained which have the characteristics given in the following table.

| Test No. | Sulphonated derivative (Percent by weight) | Acrylonitrile (Percent by weight) | Degree of conversion, percent | Specific viscosity |
|---|---|---|---|---|
| 1 | 0 | 100 | 58 | 0.337 |
| 2 | 0.59 | 99.41 | 62 | 0.396 |
| 3 | 1.19 | 99.81 | 62 | 0.347 |
| 4 | 2.39 | 97.61 | 65 | 0.388 |
| 5 | 5.97 | 94.03 | 66 | 0.356 |
| 6 | 11.95 | 88.05 | 70 | 0.401 |

Films are prepared from these polymers and dyed with the dyestuff malachite green. While the film obtained with the product of Test No. 1, i.e. the homopolymer of acrylonitrile, only acquires a faint green shade, there is observed with a proportion of 0.59% of sulphonated derivative an improvement in the dyeing which increases as the proportion of sulphonated derivative is increased.

EXAMPLE III

*Copolymerisation of Potassium Vinyloxybenzene-Sulphonate With a Mixture of Acrylonitrile and Methyl Methacrylate*

The procedure of Example II is followed, but a part of the acrylonitrile is replaced by methyl methacrylate.

With a proportion of 92.6% of acrylonitrile, 5% of methyl methacrylate and 2.4% of potassium vinyloxybenzene-sulphonate, there is obtained a copolymer having a specific viscosity of 0.284 with a degree of conversion of 65%. The copolymer obtained has a very high dye affinity.

EXAMPLE IV

*Continuous Copolymerisation of Sodium Vinyloxybenzene-Sulphonate With a Mixture of Acrylonitrile and Methyl Methacrylate*

Into a 16-litre reactor provided with an overflow and a screw-type stirrer, in which the atmosphere consists of an inert gas, are introduced:

11.900 litres of de-ionised distilled water.
1260 grams of acrylonitrile.
19.5 grams of sodium vinyloxybenzene-sulphonate.
14 grams of methyl methacrylate.

When the pH of the dispersion has been brought to 2.5 by the addition of sulphuric acid, the reaction mass is heated to 60° C.

There are then added 15.3 grams of sodium bisulphite dissolved in 30 cc. of water, then 4.72 grams of potassium chlorate dissolved in 220 cc. of water, and at intervals of 3 minutes 4 x 14 grams of methyl methacrylate.

After polymerisation for 15 minutes, the simultaneous introduction of the reactants is continued at the following hourly rates:

1180 grams of a mixture consisting of 94.7% by weight of acrylonitrile and 5.3% by weight of methyl methacrylate.
3160 grams of an aqueous 1.32°/₀₀ by weight potassium chlorate solution.
3160 grams of an aqueous 4.3°/₀₀ by weight sodium bisulphite solution, and
500 grams of an aqueous 35°/₀₀ by weight sodium vinyloxybenzene-sulphonate solution maintained at a pH of 8.5.

The mean time for which the reactants remain in the reactor is thus about 2 hours. Throughout the reaction, an inert atmosphere and a temperature of 60° C. are maintained in the reactor. The pH remains at 2.3–2.4. The polymer suspension which leaves the reactor enters an evaporator heated to eliminate the unreacted acrylonitrile and methyl methacrylate. The extent of the conversion is 71% calculated on the total weight of the monomers. The polymer is washed with water, separated and dried.

The copolymer obtained contains approximately 92% of acrylonitrile, 6.5% of methyl methacrylate and 1.5% of vinyloxybenzene-sulphonic acid. It has a specific viscosity of 0.41.

The copolymer is converted into fibre and is subjected to a dyeing test. For this purpose, there are dissolved in 100 cc. of water:

Emulsifying agent _____ cc __ 0.1
Acetic acid _____ cc __ 0.1
Sodium acetate _____ g __ 0.15 and then, at 70° C., with agitation, the dyestuff

Bleu Astrazon _____ g __ 0.06

2 g. of degreased fibres are immersed in this bath and maintained for 1 hour at boiling point.

The light absorption of the solution before and after dyeing is photometrically measured and shows that the dye absorption is 81%. Under the same conditions, an acrylonitrile-methyl-methacrylate copolymer prepared in the absence of vinyloxybenzene-sulphonic acid has a dye absorption of only 30–34%.

We claim:
1. A vinyl derivative of the general formula:

$$CH_2=CH-O-Ar(SO_3R)$$

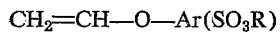

where Ar is a group selected from the class consisting of wholly aromatic unsubstituted hydrocarbon groups, aromatic hydrocarbon groups containing alkyl substituents, aromatic hydrocarbon groups containing cycloalkyl substituents and aromatic hydrocarbon groups containing halogen substituents and R is selected from the class consisting of the hydrogen atom, metal atoms and hydrocarbon groups.

2. Vinyloxybenzene sulphonic acid.

3. A homopolymer of a vinyl derivative of the general formula:

$$CH_2=CH-O-Ar(SO_3R)$$

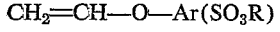

where Ar is a group selected from the class consisting of wholly aromatic unsubstituted hydrocarbon groups, aromatic hydrocarbon groups containing alkyl substituents, aromatic hydrocarbon groups containing cycloalkyl substituents and aromatic hydrocarbon groups containing halogen substituents and R is selected from the class consisting of the hydrogen atom, metal atoms and hydrocarbon groups.

4. A copolymer of acrylonitrile with a vinyl derivative of the general formula:

$$CH_2=CH-O-Ar(SO_3R)$$

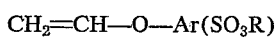

where Ar is a group selected from the class consisting of wholly aromatic unsubstituted hydrocarbon groups, aromatic hydrocarbon groups containing alkyl substituents, aromatic hydrocarbon groups containing cycloalkyl substituents and aromatic hydrocarbon groups containing halogen substituents and R is selected from the class consisting of the hydrogen atom, metal atoms and hydrocarbon groups.

5. A copolymer of acrylonitrile and methyl methacrylate with a vinyl derivative of the general formula:

$$CH_2=CH-O-Ar(SO_3R)$$

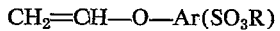

where Ar is a group selected from the class consisting of wholly aromatic unsubstituted hydrocarbon groups, aromatic hydrocarbon groups containing alkyl substituents, aromatic hydrocarbon groups containing cycloalkyl substituents and aromatic hydrocarbon groups containing halogen substituents and R is selected from the class consisting of the hydrogen atom, metal atoms and hydrocarbon groups.

6. A copolymer of acrylonitrile with a vinyl derivative of the general formula:

$$CH_2=CH-O-Ar(SO_3R)$$

where Ar is a group selected from the class consisting of wholly aromatic unsubstituted hydrocarbon groups, aromatic hydrocarbon groups containing alkyl substituents, aromatic hydrocarbon groups containing cycloalkyl substituents and aromatic hydrocarbon groups containing halogen substituents and R is selected from the class consisting of the hydrogen atom, metal atoms and hydrocarbon groups, wherein the compound of the said formula constitutes 0.5 to 15% by weight of the copolymer.

7. A copolymer of acrylonitrile and methyl methacrylate with a vinyl derivative of the general formula:

$$CH_2=CH-O-Ar(SO_3R)$$

where Ar is a group selected from the class consisting of wholly aromatic unsubstituted hydrocarbon groups, aromatic hydrocarbon groups containing alkyl substituents, aromatic hydrocarbon groups containing cycloalkyl substituents and aromatic hydrocarbon groups containing halogen substituents and R is selected from the class consisting of the hydrogen atom, metal atoms and hydrocarbon groups, wherein the compound of the said formula constitutes 0.5 to 15% by weight of the copolymer and the methyl methacrylate constitutes 1 to 10% by weight of the copolymer.

References Cited in the file of this patent
UNITED STATES PATENTS

| | | |
|---|---|---|
| 2,205,946 | Flitt | June 25, 1940 |
| 2,527,300 | Dudley | Oct. 24, 1950 |
| 2,836,578 | Teot | May 27, 1958 |